United States Patent Office 3,426,535
Patented Feb. 11, 1969

3,426,535
FLUID COUPLING WITH CONSTANT FILLING
Siegfried Mlacker, Heidenheim (Brenz), Hans Mack, Sontheim (Brenz), and Lorenz Karl, Heidenheim (Brenz), Germany, assignors to Voith Getriebe KG, Heidenheim (Brenz), Germany
Filed Sept. 19, 1966, Ser. No. 580,312
Claims priority, application Germany, Sept. 22, 1965, V 29,379
U.S. Cl. 60—54           20 Claims
Int. Cl. F16h *41/04;* F04d *29/18*

ABSTRACT OF THE DISCLOSURE

A fluid coupling with constant filling in which the turbine wheel is provided with a plurality of circumferentially distributed blade cells of different shapes and of considerably different inner diameters while the outer diameter of at least some of said blade cells is approximately the same.

---

The present invention concerns a non-variable fluid coupling, i.e. a fluid coupling the degree of filling of which cannot be changed during the operation by means of a control member operable from the outside. More specifically, the present invention concerns a coupling the liquid filling of which remains constant during the operation as to volume. Couplings of this type, which are employed in particular as starting couplings for drives with short circuit rotor motors or combustion engines, are considered couplings with constant filling also when in view of the provision of escape chambers which rotate with the coupling (accumulator chambers, primary receiving chambers, or the like) a temporary incomplete filling of the working chamber proper occurs, or expressed differently, also if a partial emptying of the working chamber proper into the likewise rotating escape chamber is possible.

With this type of non-controllable or non-variable fluid couplings, it is desired with most drives that the torque transmitted by the coupling be constant as far as possible over a wide slip range and up to small slip values. The so-called K-$s$-graphs which plotted over the slip $s$ from 0 to 100%, represent the value K, i.e. a specific ratio for the coupling and its transfer ability, must also with varying filling in its essential part, namely in the upper and medium slip range, extend horizontally, which means parallel to the abscissa and must extend to a value of K=approximately 5 to 6 or even higher values. In the lowermost slip range, the said graphs or curves must as steeply as possible drop to the nominal operational slip value and the value 0.

$$K = \frac{N_1}{D_p{}^5 \left(\dfrac{n_1}{100}\right)^3}$$

In this equation $N_1$ represents the power absorbed by the coupling, $D_p$ represents the profile diameter of the coupling, and $n_1$ represents the primary speed.

The value K thus equals the power absorption of the turbocoupling with the profile diameter $D_p = 1$ meter at an output speed of $n_1 = 100$ r.p.m.

It is further to be noted that the reference in this specification to slip curves relative to different degrees of filling should not be misunderstood. These couplings are always operated with one definite filling. However, there exists the desire to be able to operate one and the same coupling type in one instance of employment with a greater degree of filling and in another instance of employment with a less degree of filling so that with one and the same coupling type a wider torque field can be covered whereby too many types can be avoided.

The K-$s$-curves must have a sufficient and uniform grading or staggering.

In contrast thereto, with variable or controllable fluid couplings whose degree of filling can be adjusted from the outside with regard to speed control by scoops or other control means, other ideal characteristics are desired. For complete filling and a minimum slip, with this type of coupling, the K value should be approximately 1, and the entire control range should be within a value of K=0 to 2. With controllable fluid couplings it is important that the moment-filling characteristics follow a steady course within these limits. For these variable fluid couplings, therefore, different requirements apply with regard to the shape of the working chamber and the blade cells forming the working chamber and thus these variable fluid couplings differ fundamentally with regard to requirements from fluid couplings with constant filling.

In an effort to solve the problem prevailing with non-variable fluid couplings, namely to maintain constant the transmissible torque over as wide a slip range as possible, numerous suggestions have been advanced. Among these suggestions may be mentioned the arrangement of a throttling ring in the radial inner merging area from the turbine wheel to the pump wheel, furthermore, the arrangement of a so-called accumulating chamber into which a portion of the filling of the working chamber can be emptied at certain conditions of operation. These known suggestions of which the first one is described in German Patent 586,716 while the last one has been described in German Patent 836,718, have resulted in considerable improvements, but each of the two solutions still has some drawbacks inherent thereto. The throttling ring impairs the minimum slip and thus the degree of efficiency of the coupling. Moreover, a throttling ring can be realized with simple means only at a certain diameter, whereas it should be possible to design the same for different partial fillings with different diameters. In addition thereto, the throttling ring will in the merging area between the steep portion prevailing during the minimum slip and the remaining flat portion of the slip-torque diagram reduce the transmissible torque.

The above mentioned solution employing an accumulating chamber has the drawback that the course of the torque within the range of medium and high slip values cannot be sufficiently straightened or leveled. Moreover, such accumulating chamber cannot be employed in all those instances in which the direction of flow of power can change, because the accumulating chamber is effective only at one of the two power flow directions. The arrangement of one accumulating chamber each in the pump wheel and the turbine wheel is not suitable because as a result thereof very disquieting and non-uniform characteristics are obtained.

It is, therefore, an object of the present invention to provide a fluid coupling with constant filling, which will overcome the above mentioned drawbacks.

It is another object of this invention to provide a fluid coupling with constant filling which will furnish a K–$s$ diagram which is considerably straightened out.

It is a further object of this invention to provide a fluid coupling of the above mentioned type which will show an improved behavior during a change in the direction of the power transmission.

These and other objects and advantages of the invention will appear more clearly from the following specification in connection with the accompanying drawings, in which:

FIG. 1 is a partial view of a turbine wheel according to the invention as viewed in axial direction upon the blade cells, the arrangement being such that two complete cells and three outer cells follow each other.

FIGS. 2 and 3 respectively represent sections along the lines II—II and III—III of FIG. 1.

Figure 6:
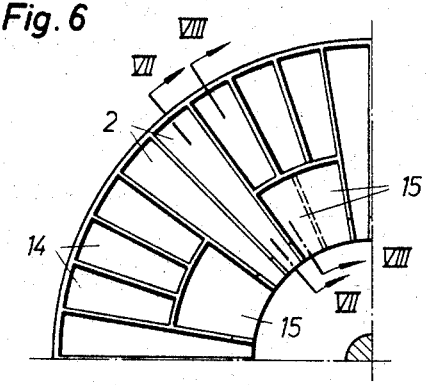
FIG. 6 is a partial view of still another embodiment of the invention according to which two complete cells and three outer partial cells follow each other while the outer partial cells have associated therewith a common inner partial cell.
Figure 7:
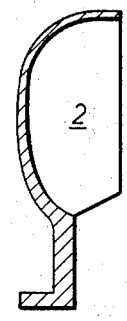
Figure 8:
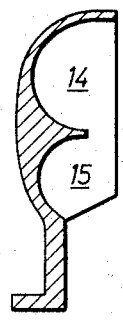

FIGS. 7 and 8 respectively illustrate sections taken along the lines VII—VII and VIII—VIII of FIG. 6.

Figure 9:
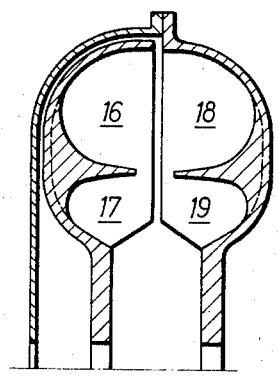

FIG. 9 illustrates a coupling in which the pump wheel as well as the turbine wheel have a mixed profile, FIG. 9 representing an axial section through the double cells.

FIGS. 10 to 14 illustrate partial views of further embodiments of a turbine wheel according to the invention.

Figure 14:
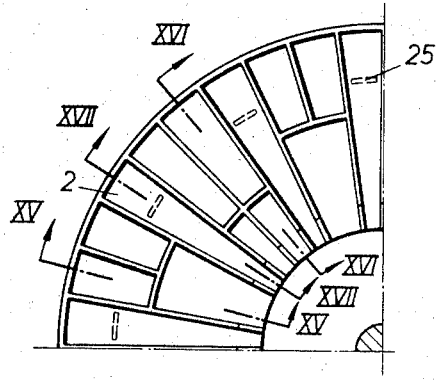
Figure 15:
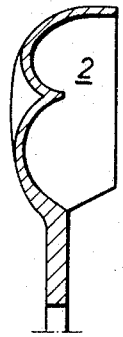
Figure 16:
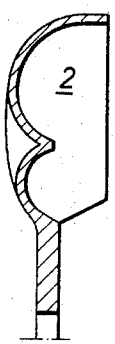
Figure 17:
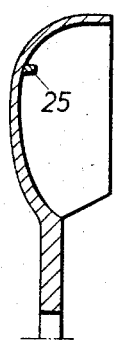

FIGS. 15 to 17 respectively illustrate sections along the lines XV—XV, XVI—XVI and XVII—XVII of FIG. 14.

Figure 18:

FIG. 18 is an axial section through still another embodiment of the invention.

Figure 19:
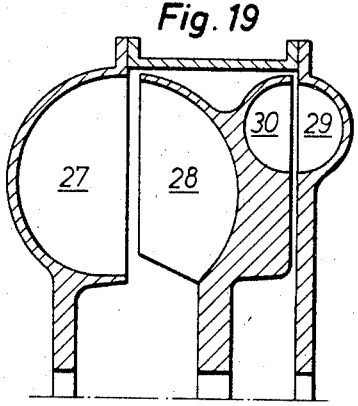

FIG. 19 shows the present invention as applied to a double coupling, according to which one coupling section has a normal profile while the other coupling section in the turbine and pump wheel has a cell profile with correspondingly larger intermediate diameter.

According to the present invention, it is suggested with a fluid coupling with constant filling as known with fluid couplings having a variable filling, i.e. with a different type of fluid couplings and for a different purpose, to arrange different blade cells distributed over the circumference of the turbine wheel and, more specifically, in such a way that in addition to the blade cells having a short inner diameter, there are uniformly or non-uniformly distributed over the circumference also blade cells with at least approximately the same outer diameter but with considerably greater inner diameter. In other words, while all cells should have the same or approximately the same outer diameter, they have different inner diameters which change from cell to cell or in conformity with a certain rhythm are alternately uniformly distributed over the circumference, or may also alternate with a certain non-regularity. For the ratio of the inner diameter of the partial cells to the outer diameter of the cells, there is in conformity with the present invention selected a value of approximately 0.55 to 0.7. With a 422 coupling, i.e. a coupling having a profile outer diameter of 422 millimeters, this results in a profile inner diameter of the partial cells of from approximately 230 to approximately 295 millimeters. It is to be understood, of course, that these are mean values which may be varied in conformity with special requirements without affecting the gist of the present invention.

According to a particular embodiment of the invention, the number of the cells with larger inner diameter should be approximately equal but preferably higher than the number of the cells with short inner diameter. With such a design of the turbine wheel of a fluid coupling with constant filling, it is possible as verified by numerous tests, to obtain considerably improved K-s characteristics over that which has been possible with all heretofore known couplings of the type involved. In general, this fundamental feature according to the invention may be varied in numerous ways. According to one embodiment of the invention, the chamber located radially inwardly of the blade cells with the greater diameter ratio $D_i:D_a$ (inner diameter to outer diameter) is filled, and, more specifically, up to the impeller gap, or the rear wall of the turbine wheel is extended correspondingly close to the pump wheel so that the turbine wheel will form smooth wall portions toward the pump wheel radially within the blade cells with the larger ratio of $D_i:D_a$.

According to a further suggestion of the invention, blade cells with a corresponding smaller mean diameter may be arranged within the blade cells with the greater $D_i:D_a$. The outer diameter of such blade cells may correspond approximately to the inner diameter of the outer blade cells. In other words, according to this feature of the present invention, double cells with partial cells located on different ranges of radii, are when looking in circumferential direction, located between complete blade cells. A plurality of outer partial cells may have associated therewith a common inner partial cell. With such a design having double cells located radially one within the other, the sub-division of the cells may be a complete one or a partial one inasmuch as the protrusion up to the impeller gap, which protrusion is provided on the rear wall and brings about the sub-division of the cell, is extended forwardly to the impeller gap or not quite as far.

According to a particular embodiment of the invention, the axial depth of the protrusion should be at least approximately one-third of the depth of the profile. Also completely sub-divided and partially sub-divided cells may be provided. With an arrangement comprising double cells and a sub-division of the cells not extending to the impeller gap, the rear wall of the turbine wheel may extend from the outer partial cell along an axially vertical plane so that the inner partial cells have a smaller axial depth than the outer partial cells. This rear wall may, however, also be inclined with regard to the impeller gap in such a way that the axial depth of the inner partial cells will decrease toward the axis. At the merging portion from the outer partial cell to the inner partial cell, advantageously a tearing-off edge for the flow will be formed. Generally spoken, the rear walls of the partial cells may in the same manner as the rear walls of the complete cells, when looking along an axial section, be shaped along an arch or semi-circle and extend from the entrance area to the outlet area. It is important that the flow will also in its outer partial cells be directed toward the pump wheel. According to the simplest embodiment of the invention, a formed annular insert is arranged in the individual blade cells at the rear wall of the turbine wheel in the radial central area. This insert will deviate the flow which in the turbine wheel in these partial cells is directed radially from the outside toward the inside and will convey said flow in said medium area toward the pump wheel.

According to the invention, the turbine wheel of a non-variable coupling should accordingly have a mixed profile, which means that cells of different profile should alternate with each other. With this design of the turbine wheel, a considerable rectification of the K-s characteristics will be obtained. On one hand, the drop of the power transmission at increasing slip will be avoided, and in the further course, an excessive increase in the torque will be prevented. At the same time, in this way, the slip during the operation will with smaller fillings be so low as it has never before been possible.

It may also be mentioned that with fluid couplings having a filling control operable during the operation, it is known to design the individual blade cells differently, preferably in the turbine wheel only. To this end, the core ring or the outer cup (rear wall of the cell) is designed differently with regard to form and/or location in the individual cells so that the core rings or outer cups will differ from each other. The said step is intended to avoid the flat spot, i.e. the non-uniformity in the slip-filling characteristic which occurs with variable fluid couplings having an inner ring. In other words, the slip-filling characteristic will be stable over its entire course and will uniformly ascend.

A particular further advantage obtained by the arrangement according to the present invention as verified by numerous tests consists in that also when the direction of power transmission is reversed, in other words, when the power temporarily is transmitted from the secondary wheel to the primary wheel so that temporarily the normally driven machine drives the driving motor, a considerably more favorable behavior of the clutch can be obtained alone by the design of the turbine wheel according to the invention.

Almost completely alike K-s lines can be obtained for both directions of power flow if in conformity with a further suggestion of the present invention, both rotors of the fluid coupling are so designed as described above for the turbine wheel.

A similar effect as obtainable with a mixed profile clutch according to the present description can also be realized with a double clutch of which one clutch section comprises an ordinary pump wheel with ordinary turbine wheel whereas the other clutch section which is filled at the same time has at least its turbine wheel provided with outer partial cells, i.e. cells with the same outer diameter as the other clutch section but with correspondingly larger inner diameter. Such a clutch is, of course, more expensive but can be justified under certain circumstances, especially if a high output is to be transmitted.

If desired, within the framework of the present invention, it is also possible to combine two mixed profile couplings to form a double coupling.

Figure 1:
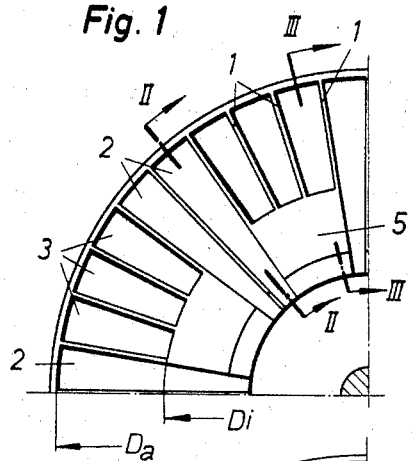
Figure 2:
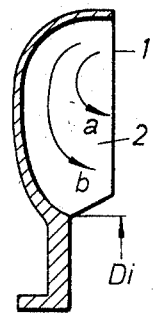
Figure 3:
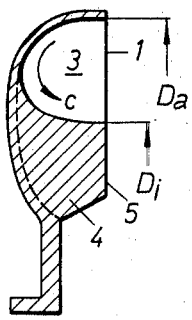

Referring now to the drawings in detail, the turbine wheel portion illustrated in FIG. 1 and extending over a circumferential angle of 90°, which is shown as axial section in FIGS. 2 and 3, has forty blades 1 defining therebetween complete cells 2 and partial cells 3. Two complete cells 2 are followed by three partial cells 3. All of these cells have the same outer diameter $D_a$ but have different inner diameters $D_i$ and $D_{i'}$. The area 4 radially inwardly of the partial cell 3 is filled in so that the turbine wheel from these areas toward the rotor gap forms smooth surfaces 5. While the flow coming from the pump wheel may, depending on the speed of the turbine wheel, i.e. depending on the respective slip in the cells, flow approximately in the direction of the arrow $a$ or in the direction of the arrow $b$, the said flow will in the partial cells 3 in the extreme instance flow in the direction indicated by the arrow $c$. The complete cells and partial cells may also be called "full size cells" and "reduced size cells" respectively.

Figure 4:
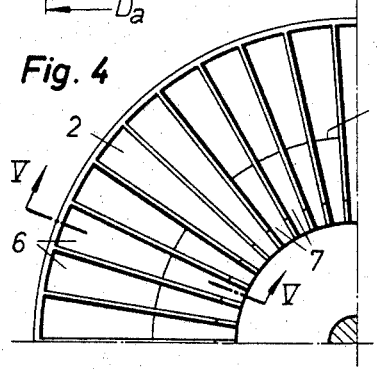
FIG. 4 is a partial view of a modified turbine wheel in which two complete cells alternate with four outer partial cells and two inner partial cells.
Figure 5:
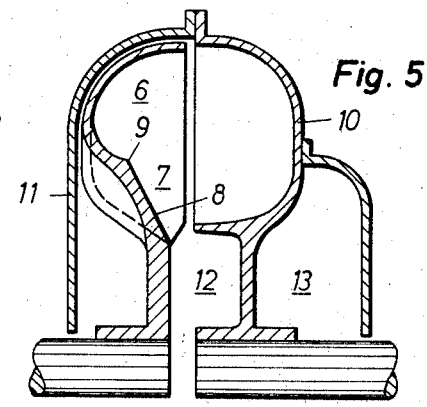
FIG. 5 is an axial section taken along the line V—V of FIG. 4 and illustrating that the rear wall of the turbine wheel extends radially within the outer partial cell and toward the pump wheel.

The embodiment of a turbine wheel according to the invention as shown in FIGS. 4 and 5 differs from that of FIGS. 1 to 3 in that always four outer partial cells 6 and two inner partial cells 7 follow two complete cells 2. The space radially inwardly of the outer cells 6 is in this instance not completely filled in but merely the rear wall 8 has been extended toward the rotor gap while being at an incline. Moreover, the sub-division of the outer and inner partial cells 6 and 7 is not completely carried out. Instead the curved rear wall of the partial cells 6 extend only over two-fifths of the axial profile depth. At the portion where the rear wall of the outer partial cells 6 merges with the rear wall of the inner partial cells 7 there is formed a tearing edge 9.

In FIG. 5, in addition to the turbine wheel according to the invention, also the pump wheel 10 is shown with its shell 11 enclosing said turbine wheel and with a collecting chamber 12 located radially within the pump wheel-working chamber and shielded with regard thereto but open toward the turbine wheel. FIG. 5 also shows a primary receiver 13.

FIGS. 6 to 8 illustrate an embodiment according to which each two full blade cells are followed by three outer partial cells 14 and one or two inner partial cells 15. The partial cells 14 and 15 are not completely separated from each other.

The coupling illustrated in FIG. 9 and provided with a mixed profile in the pump wheel is illustrated for both wheels in section by the double cells. The outer partial cells in the turbine wheel are designated with the reference numeral 16 while the inner partial cells are designated with the reference numeral 17. In the pump wheel the outer and inner cells are respectively designated with the reference numerals 18 and 19.

Figure 10:
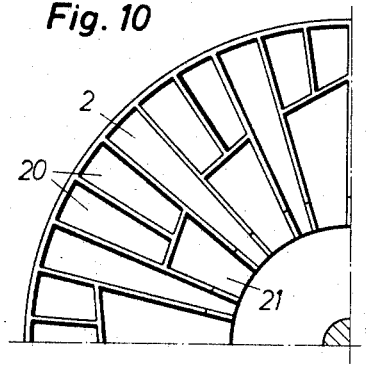

According to the embodiment illustrated in FIG. 10, each two outer partial cells 20 and inner partial cells 21 are followed by a complete cell 2, while each time three successive outer partial cells respectively have a progressively larger or smaller inner diameter.

Figure 11:
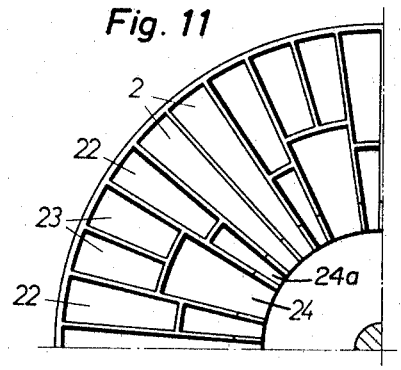

According to the embodiment of FIG. 11, the sequence of the cells is two complete cells 2, an outer partial cell 22, two outer partial cells 23 with a somewhat larger inner diameter, and an outer partial cell 22. Radially within the partial cells 22 and 23 there may be arranged one or more inner partial cells 24, 24a, or, if desired, smooth walls as shown in FIG. 3.

Figure 12:
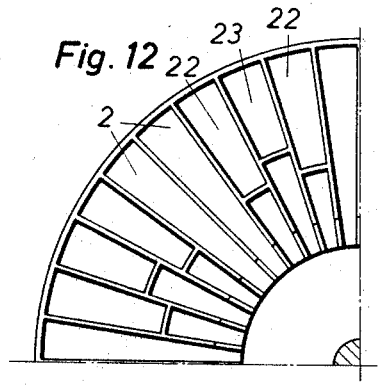
Figure 13:
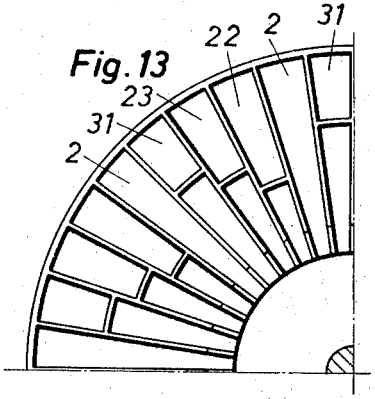

FIGS. 12 to 14 illustrate further possibilities in which the invention may be varied. FIGS. 14 to 17 are axial sections of FIG. 14. According to FIGS. 15 and 16, the subdivision of the cells into outer and inner partial cells is not effected by providing the rear wall with extensions but instead the rear wall is extended inwardly at the desired portions. In contradistinction to the other embodiments, there is furthermore indicated that also in the complete cells 2 there may be provided a certain subdivision by arranging an extension 25 on the rear wall. Such extensions or inserts on the rear wall of the cell may be of advantage even when having a relatively short diameter. In FIG. 18 there is shown a section through a blade cell which has an extension 26 with a relatively short diameter.

FIG. 19 illustrates a double coupling in twin formation with two working chambers which are always filled to the same extent. One of said working chambers is formed by an ordinary pump wheel 27 and an ordinary turbine wheel 28, whereas the other working chamber is formed by a pump wheel 29 and a turbine wheel 30 which have the same outer diameter as but have correspondingly shorter inner diameters than wheels 27, 28.

It is, of course, to be understood that the present invention is, by no means, limited to the particular embodiments shown in the drawings but also comprises any modifications within the scope of the appended claims.

What we claim is:

1. A fluid coupling with constant filling having a pump wheel and a turbine wheel, said turbine wheel being provided with a plurality of circumferentially distributed blade cells of different shapes and of considerably different inner diameters while the outer diameter of at least some of said blade cells is at least approximately the same.

2. A fluid coupling according to claim 1, in which the blade cells with the greater inner diameter have a ratio of inner diameter to outer diameter within the range of from 0.55 to 0.7.

3. A fluid coupling according to claim 1, which includes a plurality of full size blade cells and also includes a plurality of reduced size blade cells, the number of reduced size blade cells at least equalling that of said full size blade cells.

4. A fluid coupling according to claim 3, in which at least some of said reduced size blade cells are arranged at the radially outer area of said turbine wheel, and in which that wall surface portion of the turbine wheel which extends radially inwardly from the inner edge of said reduced size blade cells is located in a substantially vertical plane.

5. A fluid coupling according to claim 3, which includes a first group of reduced size blade cells arranged at the radially outwardly located area of said turbine wheel and also includes a second group of reduced size blade cells arranged radially inwardly of said first group of said reduced size blade cells.

6. A fluid coupling according to claim 3, which includes a plurality of groups of reduced size blade cells arranged within the radially outwardly located area of said turbine wheel, and in which each of said radially outwardly located group of reduced size blade cells is separated from the respective adjacent group of radially outwardly located reduced size blade cells by at least one full size blade cell.

7. A fluid coupling according to claim 1, which includes a plurality of reduced size blade cells and also includes a plurality of reduced size blade cells formed by insert means in said turbine wheel.

8. A fluid coupling according to claim 1, which includes a plurality of full size blade cells and also includes a plurality of reduced size blade cells formed by a forward extension of the rear wall of the turbine wheel.

9. A fluid coupling according to claim 1, which includes a plurality of full size blade cells and also includes a plurality of reduced size blade cells, the rear walls of said reduced blade cells and the rear walls of the full size blade cells being curved from the entrance edge to the discharge edge of the respective blade cells.

10. A fluid coupling according to claim 9, in which the reduced size blade cells comprise outer blade cells located at the peripheral outer portion of the turbine wheel, and in which the discharge edge of said outer blade cells is located at the gap between said turbine wheel and said pump wheel.

11. A fluid coupling according to claim 9, in which said reduced blade cells include inner blade cells located at the peripheral inner portion of said turbine wheel, the entrance edge of said inner blade cells being located at the gap between said turbine wheel and said pump wheel.

12. A fluid coupling with constant filling, which includes: a pump wheel and a turbine wheel, said turbine wheel being provided with a plurality of circumferentially distributed blade cells of different shapes and of considerably different inner diameters, said blade cells including full size blade cells and reduced size blade cells arranged near the outer periphery of the turbine wheel, and in which the discharge edge of said reduced size blade cells at the outer periphery of the turbine wheel is set back with regard to the gap between said turbine wheel and said pump wheel, the outer diameter of at least some of said blade cells being at least approximately the same.

13. A fluid coupling according to claim 1, which includes a plurality of full size blade cells and also includes a plurality of reduced size blade cells arranged near the inner peripheral portion of said turbine wheel, and in which the entrance edge of said reduced size blade cells at the inner peripheral portion of said turbine wheel is set back with regard to the gap between said turbine wheel and said pump wheel.

14. A fluid coupling according to claim 12, in which the rear wall of the reduced blade cells are flatly inclined from the discharge edge of each reduced cell at the outer peripheral portion of the turbine wheel toward the gap between the turbine wheel and the pump wheel.

15. A fluid coupling according to claim 1, which includes a plurality of full size blade cells and also includes a plurality of reduced size blade cells, and in which at least some of the reduced size blade cells have different inner diameters.

16. A fluid coupling according to claim 1, which includes a plurality of full size blade cells and also a plurality of reduced size blade cells, and in which at least some of the reduced size blade cells are sub-divided completely in different ways.

17. A fluid coupling according to claim 1, which includes sharp-edged insert means extending from the rear wall of said cells.

18. A fluid coupling according to claim 1, which includes sharp-edged insert means extending from the rear wall of the cells having at least inner diameter.

19. A fluid coupling according to claim 1, in which also the pump wheel is provided with a plurality of circumferentially distributed blade cells of different shapes and of considerably different inner diameters.

20. A fluid coupling with constant filling of the twin formation type which includes: a twin turbine wheel, and in which one portion of the twin turbine wheel comprises full size blade cells whereas the other portion of the twin turbine wheel is provided with reduced size blade cells having at least approximately the same outer diameter as but a considerably greater inner diameter than said full size blade cells of said one portion of the twin turbine wheel.

References Cited

UNITED STATES PATENTS

| 2,986,885 | 6/1961 | Ryan. | |
| 1,703,407 | 2/1929 | Shank | 60—54 |
| 2,679,728 | 6/1954 | Trail | 60—54 |
| 2,687,013 | 8/1954 | Sinclair | 60—54 |
| 2,696,081 | 12/1954 | Kiep | 60—54 |

FOREIGN PATENTS 1,021,354   3/1966   Great Britain.

EDGAR W. GEOGHEGAN, *Primary Examiner.*

U.S. Cl. X.R.

103—115